(12) United States Patent
Yoshimura (10) Patent No.: US 12,115,615 B2
(45) Date of Patent: Oct. 15, 2024

(54) WORK SUPPORT

(71) Applicant: KOSMEK LTD., Kobe (JP)

(72) Inventor: Gaku Yoshimura, Kobe (JP)

(73) Assignee: KOSMEK LTD., Kobe (JP)

( * ) Notice: Subject to any disclaimer, the term of this patent is extended or adjusted under 35 U.S.C. 154(b) by 368 days.

(21) Appl. No.: 17/636,187

(22) PCT Filed: Aug. 13, 2020

(86) PCT No.: PCT/JP2020/030739
§ 371 (c)(1),
(2) Date: Feb. 17, 2022

(87) PCT Pub. No.: WO2021/049244
PCT Pub. Date: Mar. 18, 2021

(65) Prior Publication Data
US 2022/0288734 A1    Sep. 15, 2022

(30) Foreign Application Priority Data

Sep. 15, 2019 (JP) ................. 2019-167873

(51) Int. Cl.
*B23Q 3/10* (2006.01)
*F15B 15/22* (2006.01)

(52) U.S. Cl.
CPC .............. *B23Q 3/106* (2013.01); *F15B 15/22* (2013.01); *B23Q 2703/12* (2013.01)

(58) Field of Classification Search
CPC .......... B23Q 3/106; B23Q 3/10; B23Q 3/108; B23Q 2703/12; F15B 15/22; Y10T 279/17376; Y10T 279/17471; Y10T 279/1249; Y10T 279/1021; B23B 31/204; B23B 31/305; B23B 2231/2091
(Continued)

(56) References Cited

U.S. PATENT DOCUMENTS

2015/0000516 A1*  1/2015  Haruna .............. B23Q 1/009
                                                        92/172
2021/0190236 A1    6/2021  Haruna

FOREIGN PATENT DOCUMENTS

CN    110131235 A  *  8/2019  .............. B23Q 3/00
JP    2012091308 A  *  5/2012
(Continued)

OTHER PUBLICATIONS

1 Office Action dated Oct. 7, 2022 issued in corresponding European application No. 20864148.0.
(Continued)

*Primary Examiner* — David S Posigian
*Assistant Examiner* — Michael A Gump
(74) *Attorney, Agent, or Firm* — BACON & THOMAS, PLLC (57) ABSTRACT

A support rod (3) is inserted in a housing (1) so as to be movable in an up-down direction. An actuation chamber (21) is provided in a lower end portion of the housing (1). An output member (24) is moved upward by pressurized oil supplied to the actuation chamber (21). In the actuation chamber (21), to which pressurized oil is supplied, a release spring (33) is attached between a leading end wall (31) of the actuation chamber (21) and a flange portion (25a) provided to a base end portion of the output member (24). The release spring (33) biases the output member (24) downward.

7 Claims, 4 Drawing Sheets

(58) Field of Classification Search
USPC .................................................. 269/20, 4.07
See application file for complete search history.

(56) References Cited

FOREIGN PATENT DOCUMENTS

KR  10-2018-0119625 A   11/2018
WO  WO-2006046420 A1 *  5/2006  ............... B23Q 7/04

OTHER PUBLICATIONS

Search Report dated Oct. 13, 2020, issued in corresponding International application No. PCT/JP2020/030739.
Office Action dated Jun. 19, 2023 issued in corresponding Korean application No. 10-2022-7007365.

* cited by examiner

WORK SUPPORT

TECHNICAL FIELD

The present invention relates to a work support configured so that its support rod is locked by contraction of a collet.

BACKGROUND ART

Such a known work support is, for example, described in Patent Literature 1 (International Patent Publication No. 2006/046420). The known device is structured as follows.

A housing of a work support is fixed to a table functioning as a stationary stand. A support rod is inserted in the housing so as to be movable in an up-down direction. A collet is fitted over an outer periphery of the support rod. An annular first piston is inserted outward of the collet. As the first piston moves downward, the first piston grips and holds the support rod via the collet. A cylinder hole is bored in a lower wall of the housing. A second piston of an output member is hermetically inserted in the hole via a sealing member so as to be movable in the up-down direction. The output member has a piston rod (operation bolt) having a diameter smaller than that of the second piston. The piston rod protrudes upward from the second piston. A spring is attached between the support rod and the piston rod. The spring biases the support rod and the piston rod so that they recede from each other. A second actuation chamber is provided below the second piston. Pressurized oil is supplied to and discharged from the second actuation chamber. A protrusion is provided so as to protrude radially inward from an inner peripheral wall of an upper end portion of the cylinder hole. A spring chamber is provided between the protrusion and a top surface of the second piston, that is, above the second piston. A release spring (second spring) is attached in the spring chamber. The spring chamber is communicatively connected to a ventilation hole (vertical passage) bored through the lower wall of the housing. The supply and discharge hole is communicatively connected to a supply and discharge passage provided in the table. As the second piston moves in the up-down direction, air is supplied/discharged between the inside of the spring chamber and the outside of the housing through the inside of the housing, the ventilation hole, and the supply and discharge passage.

CITATION LIST

Patent Literature

Patent Literature 1: International Patent Publication No. 2006/046420

SUMMARY OF INVENTION

Technical Problem

In the known work support, the spring chamber is a space filled with air and located above the second piston. Due to this, air is supplied/discharged between the inside of the spring chamber and the inside of the housing as the second piston moves in the up-down direction. This excessively increases/decreases the pressure of air in the housing. In order to keep the pressure of air in the housing at a predetermined level, it is necessary to provide, in the lower wall of the housing and in the table, the ventilation hole through which air is supplied/discharged between the inside of the housing and the outside. In addition, a supply and discharge passage through which pressurized oil is supplied to/discharged from the second actuation chamber is provided in the lower wall of the housing and in the table. These passages are disposed in the housing and in the table complicatedly.

An object of the present invention is to provide a compact work support having a mechanically simple structure.

Solution to Problem

In order to achieve the above object, in an aspect of the present invention, a work support is structured as follows, as shown in FIG. 1 to FIG. 3 and FIG. 4, for example.

A support rod 3 is inserted in a housing 1 so as to be movable toward a leading end side and toward a base end side in an axial direction of the support rod 3. A collet 5 is fitted over an outer peripheral wall of the support rod 3. A piston 6 is inserted in the housing 1 so as to be movable in the axial direction. The piston 6 is configured to cause the collet 5 to grip and hold the support rod 3. An actuation chamber 21 is provided in a base end portion of the housing 1. An output member 24 is configured to be moved toward the leading end side in the axial direction by pressurized oil supplied to the actuation chamber 21. In the actuation chamber 21, to which pressurized oil is supplied, a release spring 33 is attached between a leading end wall 31 of the actuation chamber 21 and a flange portion 25a provided to a base end portion of the output member 24. The release spring 33 is configured to bias the output member 24 toward the base end side. A biasing mechanism 38 is configured to bias the support rod 3 and the output member 24 so that the support rod 3 and the output member 24 recede from each other.

In the above aspect of the present invention, the following functions and effects are provided.

In the work support of the above aspect of the invention, the release spring is disposed in the actuation chamber, to which pressurized oil is supplied, and is attached between the leading end wall of the actuation chamber and the flange portion provided to the base end portion of the output member. Due to this, compared to the known work support, in which the release spring is attached in the space (spring chamber) filled with air and located above (on the leading end side relative to) the second piston, the work support of this aspect can reduce, by the capacity of the spring chamber, the amount of air supplied to/discharged from the housing by the output member through the movement of the output member in the axial direction. It is therefore possible to prevent excessive increase/decrease in the pressure of air in the housing, and it is easy to keep the pressure of air in the housing at a predetermined level. As a result, there is no need to provide a ventilation hole, through which air is supplied/discharged between the inside of the housing and the outside, in a lower wall of the housing and in the table. In addition, a supply and discharge passage connected to the ventilation hole does not have to be provided in the table. This allows the work support of the above aspect of the invention to have a compact size and a mechanically simple structure.

It is preferable to incorporate the following features (1) to (4) into the above aspect of the present invention.

(1) As shown in FIG. 1 to FIG. 3 and FIG. 4, for example, the actuation chamber 21 includes: a base-end-side actuation chamber 43 provided on the base end side in the axial direction relative to the flange portion 25a; and a leading-end-side actuation chamber 44 provided on the leading end side in the axial direction relative to the flange portion 25a, the leading-end-side actuation chamber 44 being communicatively connected to the base-end-side actuation chamber 43 by a communication passage 28 provided in the output member 24. The release spring 33 is disposed in the leading-end-side actuation chamber 44.

In this arrangement, a space for the release spring filled with pressurized oil is easily provided.

(2) As shown in FIG. 1 to FIG. 3 and FIG. 4, for example, the communication passage 28 includes: a first communication passage 28a opening onto a base end surface of the output member 24, the base end surface being on the base end side in the axial direction; and a second communication passage 28b, which is communicatively connected to the first communication passage 28a and opens onto an outer peripheral surface of the output member 24.

In this arrangement, the communication passage connecting the base-end-side actuation chamber to the leading-end-side actuation chamber is easily provided in the output member.

Figure 4:
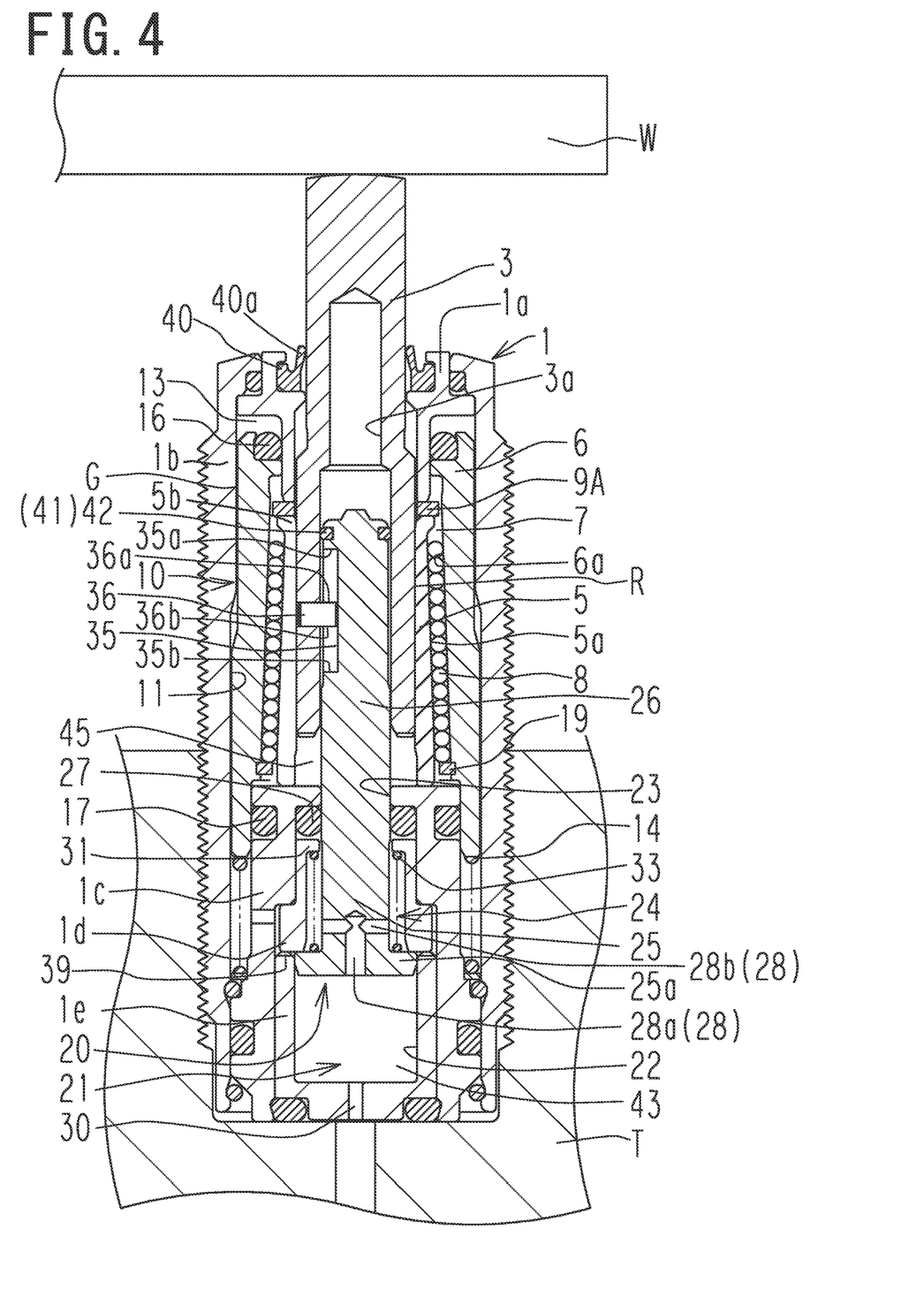
FIG. 4 shows a second embodiment of the present invention, and is a diagram similar to FIG. 3.

(3) As shown in FIG. 4, for example, the actuation chamber 21 functions as a second actuation chamber 21, and the work support further includes: a first actuation chamber 13 configured to move the piston 6 toward the base end side in the axial direction, the first actuation chamber 13 being communicatively connected to the leading-end-side actuation chamber 44; and a first spring 14 configured to move the piston 6 toward the leading end side in the axial direction. The first spring 14 is disposed in the first actuation chamber 13, to which pressurized oil is supplied.

Compared to the known work support, in which the first spring is attached in the space (first spring chamber) filled with air, the thus arranged work support can further reduce, by the capacity of the first spring chamber, the amount of air supplied to/discharged from the housing by the output member through the movement of the output member in the axial direction. It is therefore possible to further prevent excessive increase/decrease in the pressure of air in the housing, and it is easier to keep the pressure of air in the housing at a predetermined level.

Furthermore, corrosion of the first spring is prevented by the oil in the first actuation chamber. The corrosion of the release spring is prevented by the oil in the second actuation chamber.

(4) As shown in FIG. 4, for example, the first spring 14 is disposed on the base end side in the axial direction relative to the piston 6, in the first actuation chamber 13.

With such a simple lean arrangement, the piston is moved by the first spring toward the leading end side in the axial direction.

Advantageous Effects of Invention

According to embodiments of the present invention, it is possible to provide a compact work support having a mechanically simple structure.

DESCRIPTION OF EMBODIMENTS

Figure 1:
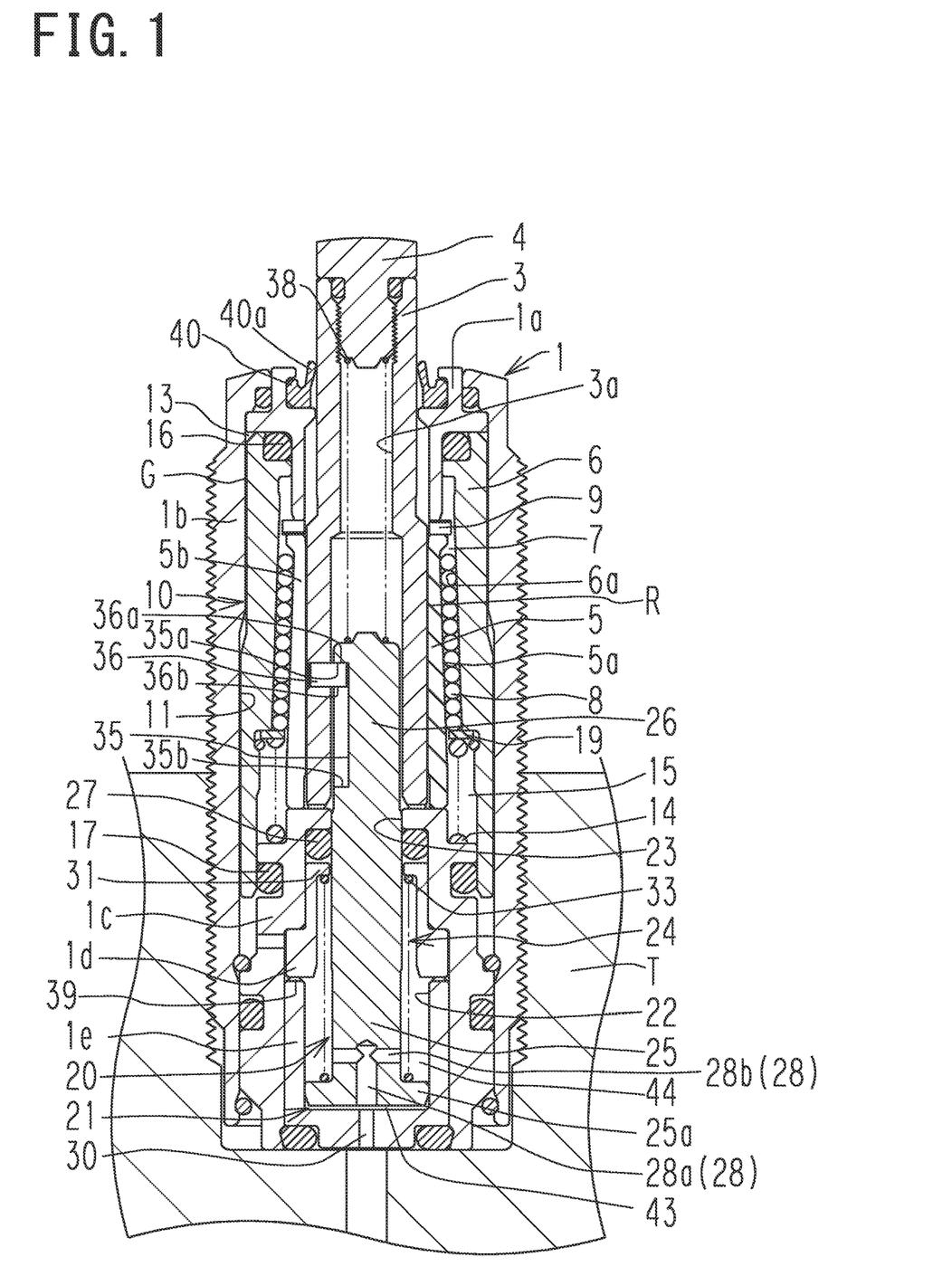
FIG. 1 shows a first embodiment of the present invention, and is an elevational view in section of a work support in a release state.
Figure 2:
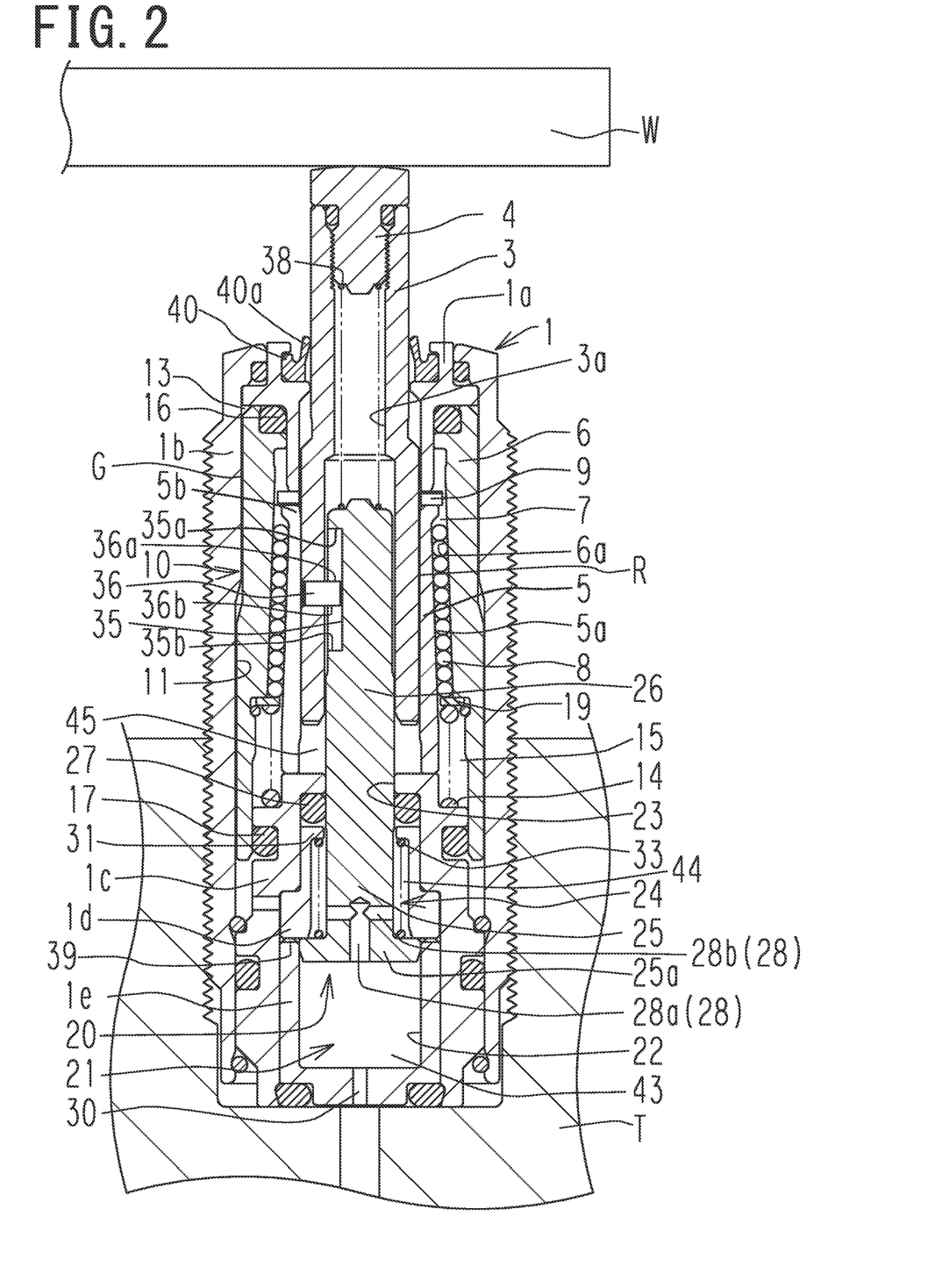
FIG. 2 is an elevational view in section of the work support, used to describe operations of the work support, and is a diagram similar to FIG. 1.
Figure 3:
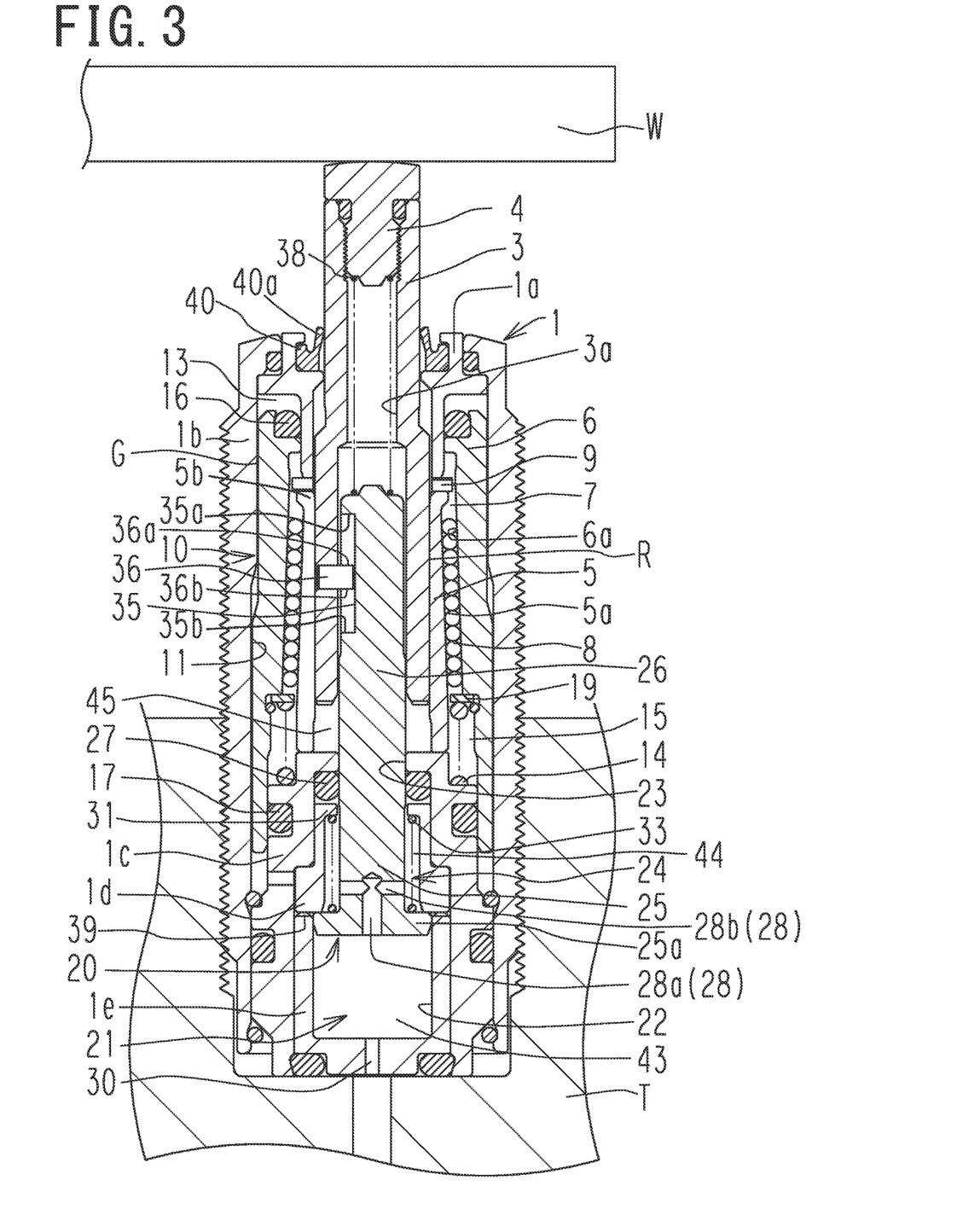
FIG. 3 is an elevational view in section of the work support in a lock state, and is a diagram similar to FIG. 1.

FIG. 1 to FIG. 3 show a first embodiment of the present invention. This embodiment deals with a case in which the present invention is applied to a hydraulic work support, by way of example. First of all, the structure of the work support will be described.

An accommodation hole is bored in a table T functioning as a stationary stand, and an internal thread portion is provided on an inner peripheral wall of the accommodation hole. An external thread portion provided on an outer peripheral wall of a housing 1 is screwed onto the internal thread portion, so that the housing 1 is fixed to the accommodation hole. The housing 1 includes: an upper wall 1a; a tubular barrel portion 1b; a support member 1c; a first block 1d; and a second block 1e. The support member 1c has a tubular shape and is fixed to a lower portion of a tubular hole of the barrel portion 1b. The first block 1d and the second block 1e (base end wall) stacked in an up-down direction are inserted in a tubular hole of the support member 1c. A support rod 3 is inserted through the upper wall 1a of the housing 1 so as to be movable in the up-down direction (toward a leading end side and toward a base end side in an axial direction of the support rod 3). A push bolt 4, which is an element of the support rod, is attached to an upper portion of the support rod 3. While in this embodiment, the upper wall 1a, the barrel portion 1b, the support member 1c, the first block 1d, and the second block 1e are separable elements, two or more of these may be unitary with one another.

An upper half portion of an outer peripheral surface of the support rod 3 is designed to have a diameter smaller than that of its lower half portion. A step portion between the upper and lower half portions is configured to be engageable with a receiver provided on the upper wall 1a of the housing 1. A region R to be gripped and held is provided on the lower half portion, and a tubular collet 5 is fitted over the region R. The collet 5 includes: a tapered outer peripheral surface 5a tapering down upward; and a slit 5b extending in the up-down direction. The slit 5b allows the collet 5 to elastically contract. An annular first piston (piston) 6 is disposed on an outer peripheral side of the collet 5. A tapered inner peripheral surface 6a of the first piston 6 is opposed from above to the tapered outer peripheral surface 5a of the collet 5. A plurality of balls 8 are inserted in an annular tapered gap 7 created between the tapered outer peripheral surface 5a and the tapered inner peripheral surface 6a. In this embodiment, a lower end portion of the collet 5 is received from below by an upper end surface of the support member 1c of the housing 1, while an upper end portion of the collet 5 is received from above by the upper wall 1a of the housing 1 via a metal wave washer (elastic member) 9. Instead of the metal wave washer functioning as the elastic member, the elastic member may be structured by a coned disc spring, a coil spring, or an element made of other materials such as resin and rubber, which will be described later.

A first cylinder 10 for actuation includes: the first piston 6 inserted in the axial direction in a first cylinder hole 11 in the barrel portion 1b of the housing 1; a first actuation chamber 13 configured to lower the first piston 6; and a first spring 14 configured to raise the first piston 6. The first spring 14 is attached in a spring chamber 15 provided in a lower portion of the first piston 6.

To be more specific, an upper portion of the first piston 6 is hermetically guided to the upper wall 1*a* by a sealing member 16 with respect to the up-down direction, while a lower portion of the first piston 6 is hermetically guided to the support member 1*c* by a sealing member 17 with respect to the up-down direction. As pressurized oil is supplied to the first actuation chamber 13, a downward force is applied to a large annular pressure-receiving surface on an upper end of the first piston 6, while an upward force is applied to a small annular pressure-receiving surface on a lower end of the first piston 6. Due to the difference between the upward and downward forces, the first piston 6 descends.

The first spring 14 is structured by a compression coil spring in this embodiment. The first spring 14 is attached between a spring receiver 19 attached to the lower portion of the first piston 6 and the support member 1*c*. The spring receiver 19 receives the balls 8 from below. The first spring 14 biases the first piston 6 upward relative to the support member 1*c*.

A second cylinder 20 for up-down movement is provided to extend in the support member 1*c*, in the first block 1*d*, and in the second block 1*e*. The second cylinder 20 is structured as follows. A second actuation chamber (actuation chamber) 21 is provided in a base end portion of the housing 1. The second actuation chamber 21 is defined by: a part of the tubular hole of the support member 1*c*; a tubular hole of the first block 1*d*; and a tubular hole of the second block 1*e*. An output member 24 is hermetically inserted in the second actuation chamber 21 so as to be movable in the up-down direction. The second actuation chamber 21 includes: a second cylinder hole 22 provided in the tubular hole of the second block 1*e*; and a rod hole 23 having a diameter smaller than that of the second cylinder hole 22 and provided in the tubular hole of the support member 1*c*. In the cylinder hole 22, a flange portion 25*a* of a second piston 25 of the output member 24 is guided between its lower limit position (base-end-side limit position) and its upper limit position (leading-end-side limit position) in the up-down direction (in the axial direction of the support rod). A piston rod 26 of the output member 24 is hermetically inserted in the rod hole 23 via a sealing member 27.

A communication passage 28 is provided in the second piston 25. A first end portion of the communication passage 28 opens onto an under surface of the second piston 25, while second end portions of the communication passage 28 open onto an outer peripheral surface of the second piston 25. The communication passage 28 includes a first communication passage 28*a* and a second communication passage 28*b*. The first communication passage 28*a* extends in the axial direction and opens onto a base end surface of the second piston 25, which surface is on the base end side in the axial direction. The second communication passage 28*b* opens onto the outer peripheral surface of the second piston 25 and extends in a radial direction of the piston. The second communication passage 28*b* is communicatively connected to the first communication passage 28*a*. In this embodiment, the second piston 25 (except the flange portion 25*a*) and the piston rod 26 are designed to have a substantially same diameter and they are unitary with each other. Instead thereof, the second piston 25 and the piston rod 26 may be formed as separate members and then combined and fixed together. The output member 24 is structured by the second piston 25 having the flange portion 25*a* and by the piston rod 26.

The second actuation chamber 21 includes: a base-end-side actuation chamber 43 provided on the base end side in the axial direction relative to the flange portion 25*a*; and a leading-end-side actuation chamber 44 provided on the leading end side in the axial direction relative to the flange portion 25*a*. The base-end-side actuation chamber 43 and the leading-end-side actuation chamber 44 are communicatively connected to each other by the communication passage 28.

A pressurized oil supply and discharge passage 30 communicatively connected to the second actuation chamber 21 (to the base-end-side actuation chamber 43) is provided through a lower wall of the second block 1*e*. A protrusion 31, functioning as a leading end wall of the actuation chamber 21, protrudes from an upper end portion of the first block 1*d* inward in the radial direction of the output member 24. A second spring (release spring) 33 is attached between the protrusion 31 and the flange portion 25*a* provided at a lower end portion of the second piston 25. The second spring 33 biases the second piston 25 downward relative to the housing 1. The second spring 33 is thus attached in the leading-end-side actuation chamber 44 of the second actuation chamber 21, to which pressurized oil is supplied. This prevents corrosion of the second spring 33. An outer peripheral surface of the flange portion 25*a* is guided to an inner peripheral surface of the tubular hole of the first block 1*d* so as to be slidable in the up-down direction. In this embodiment, the second spring 33 is structured by a compression coil spring.

A leading end portion of the piston rod 26 is inserted in a tubular hole 3*a* of the support rod 3. A guide groove 35 is provided on an outer peripheral wall of a leading-end-side portion of the piston rod 26 so as to extend in the up-down direction. A pin 36 is attached in a through hole provided through a tubular wall of the support rod 3, and the pin 36 is inserted in the guide groove 35. An upper engaging portion 35*a* is provided on an upper end wall of the guide groove 35, while a lower engaging portion 35*b* is provided on a lower end wall of the groove 35. An upper engaged portion 36*a* configured to be engageable with the upper engaging portion 35*a* is provided on an upper wall surface of the pin 36. A lower engaged portion 36*b* configured to be engageable with the lower engaging portion 35*b* is provided on a lower wall surface of the pin 36. An advance spring (biasing mechanism) 38 is attached between a leading end surface of the piston rod 26 and a lower end surface of the push bolt 4. The advance spring 38 biases the support rod 3 and the piston rod 26 so that they recede from each other. The advance spring 38 of this embodiment is structured by a compression coil spring.

A communication passage 39, which communicatively connects the first actuation chamber 13 to the second actuation chamber 21, is provided between a groove provided on an upper end portion of the second block 1*e* and a lower end portion of the first block 1*d*. The communication passage 39 further penetrates a peripheral wall of the support member 1*c*. In the first actuation chamber 13, a throttle passage G is provided in an annular gap created between the first piston 6 and the first cylinder hole 11 of the housing 1. This increases the flow resistance of fluid flowing through the throttle passage G, which prolongs the period of time needed to increase/decrease the pressure in the first actuation chamber 13. This delays therefore the timing at which the first piston 6 starts to descend/ascend. Thus, the timing at which the first piston 6 starts locking/releasing the support rod 3 is delayed, and therefore it is possible to lock/release the support rod 3 reliably after the piston rod 26 has been raised/lowered. Although the throttle passage G is structured by the whole annular gap in this embodiment, the present disclosure is not limited to this. The throttle passage G may be structured by a part of the annular gap. Instead of or in addition to this, a throttle passage may be provided to the communication passage 39.

An insertion hole is bored through the upper wall 1a of the housing 1 in the up-down direction. The support rod 3 is inserted in the insertion hole. A dust seal 40 functioning as a sealing member is attached to a peripheral wall of an upper end portion of the insertion hole. A lip portion 40a of the dust seal 40 is in close contact with the outer peripheral surface of the support rod 3. This prevents foreign matter such as chips and air from coming in or out between the inside and outside of the housing 1.

Operations of the above-described work support will be described with reference to FIG. 1 and FIG. 3. In a release state shown in FIG. 1, the first piston 6 has been raised by the first spring 14, and this allows the collet 5 to expand due to the elastic restoring force of the collet 5. Furthermore, the second piston 25 and the piston rod 26 have been lowered by the second spring 33. Due to this, the piston rod 26 has lowered the support rod 3 against the advance spring 38 to its lower limit position via the upper engaging portion 35a and the upper engaged portion 36a.

A workpiece W is brought horizontally to a position above the push bolt 4 in the above-described release state.

To cause the work support to transition from the release state of FIG. 1 to a lock state of FIG. 3, pressurized oil is supplied through the supply and discharge passage 30 to the base-end-side actuation chamber 43 of the second actuation chamber 21. As a result, pressurized oil in the second actuation chamber 21 at first raises the second piston 25 and the piston rod 26 against the second spring 33. Subsequently, the piston rod 26 raises the support rod 3 via the advance spring 38 and via the push bolt 4. At this time, air pushed out of the tubular hole 3a of the support rod 3 by the piston rod 26 flows into an accommodation chamber 45 created between a lower end surface of the support rod 3 and the upper end surface of the support member 1c as a result of the ascent of the support rod 3. Thereafter, an upper end surface of the push bolt 4 comes into contact with the workpiece W, as shown in FIG. 2.

Subsequently, the second piston 25 moves to its upper limit position. While the second piston 25 moves to its upper limit position, pressurized oil in the second actuation chamber 21 is supplied to the first actuation chamber 13 through the communication passage 39. When the pressure in the first actuation chamber 13 exceeds a predetermined set pressure (i.e., a pushing force corresponding to the upward biasing force of the first spring 14), a force corresponding to the difference between upward and downward hydraulic forces applied from the first actuation chamber 13 to the first piston 6 acts to the first piston 6. As the downward force of the difference (the difference between the upward and downward forces) moves the first piston 6 downward, the tapered inner peripheral surface 6a of the first piston 6 is smoothly engaged with the tapered outer peripheral surface 5a of the collet 5 while rolling the balls 8 downward, to cause the collet 5 to contract. Because of this, the contracting collet 5 pushes the region R of the support rod 3 toward the axis of the support rod 3, and thereby grips and holds (firmly holds) the support rod 3 at a height level shown in FIG. 3. A top surface of the workpiece W is machined in this lock state and a downward pushing force exerted in the machining process is reliably received from below by virtue of the support of the support rod 3.

After the machining process is finished, pressurized oil in the second actuation chamber 21 is discharged. As a result, the second piston 25 and the piston rod 26 descend at first. Thereafter, the locked support rod 3 is released. A more detailed description will be given below.

As the pressurized oil is discharged, first of all, the second piston 25 and the piston rod 26 are lowered by the second spring 33. When the pressure in the first actuation chamber 13 becomes lower than the predetermined set pressure, the first piston 6 is pushed upward by the first spring 14, and the first piston 6 moves upward smoothly while rolling the balls 8 on the tapered inner peripheral surface 6a. Consequently, the collet 5 expands due to its elastic restoring force, to release the locked support rod 3. Due to this, the second piston 25 and the piston rod 26 descend further, and the piston rod 26 causes the support rod 3 to return to its lower limit position shown in FIG. 1 via the upper engaging portion 35a and the upper engaged portion 36a.

The above-described first embodiment provides the following functions and effects.

In the work support of the above-described embodiment, the second spring 33 is attached in the second actuation chamber 21, to and from which pressurized oil is supplied and discharged. Due to this, compared to the known work support, in which the release spring is attached in the space filled with air and located above (on the leading end side relative to) the second piston, the work support of this embodiment can reduce, by the capacity of the spring chamber of the known device, the amount of air supplied to/discharged from the housing 1 through the movement of the second piston 25. It is therefore possible to prevent excessive increase/decrease in the pressure of air in the housing 1, and it is easy to keep the pressure of air in the housing 1 at a predetermined level. As a result, there is no need to provide a ventilation hole, through which air is supplied and discharged between the inside and outside of the housing 1, in a lower end portion of the housing 1 of the work support of this embodiment. In addition, a supply and discharge passage connected to the ventilation hole does not have to be provided in the table T. This allows the work support of this embodiment to have a compact size and a mechanically simple structure.

FIG. 4 shows a second embodiment. In the second embodiment, components the same as or similar to the components in the first embodiment are given the same reference numerals, in principle. The following description deals with features different from those in the first embodiment.

The second embodiment shown in FIG. 4 is different from the first embodiment in the following points.

In the work support of the first embodiment shown in FIG. 1, the spring chamber 15 is provided in the lower portion of the first piston 6, and the spring chamber 15 is filled with air. The first spring 14 is attached in the spring chamber 15. To the contrary, a work support of the second embodiment is structured as follows. The first spring 14 is attached in the first actuation chamber 13, to which pressurized oil is supplied, and is attached below the first piston 6 (on the base end side relative to the first piston 6). Thus the oil in the first actuation chamber 13 prevents the corrosion of the first spring 14.

The work support of this embodiment has no push bolt 4. In this case, the support rod 3 has, on its upper end surface, a contact portion configured to come into contact with a workpiece.

An air spring 41 as a biasing mechanism is provided between the piston rod 26 and the tubular hole 3a of the support rod 3. The air spring 41 is structured as follows. An attachment groove is provided on a leading-end-side portion of an outer peripheral wall of the piston rod 26 so as to extend in its circumferential direction, and a sealing member 42 is attached in the attachment groove. The piston rod 26 is inserted in the tubular hole 3*a* of the support rod 3 via the sealing member 42, and therefore the space in the tubular hole 3*a* is tightly closed. Due to this, as the piston rod 26 is inserted in the tubular hole 3*a* of the support rod 3, air in the tubular hole 3*a* is compressed, which increases the pressure in the tubular hole 3*a*. The increased pressure force is applied to the support rod 3 and the piston rod 26, as a biasing force to bias the support rod 3 and the piston rod 26 so that they recede from each other.

Furthermore, the elastic member provided between the collet 5 and the upper wall 1*a* of the housing 1 is structured by an annular member 9A made of rubber.

In the first embodiment, the first spring 14 is attached in the spring chamber 15 created between: the spring receiver 19 attached to the lower portion of the first piston 6; and the support member 1*c* of the housing 1. The spring chamber 15 is filled with air. In the second embodiment, to the contrary, the first spring 14 is attached in the first actuation chamber 13, specifically in the space created between the first piston 6 and the support member 1*c*. Because the first spring 14 is attached in the first actuation chamber 13 to which pressurized oil is supplied, corrosion of the first spring 14 is prevented by the oil in the first actuation chamber 13.

Compared to the known work support, in which the first spring is attached in the space (first spring chamber) filled with air, the work support of this embodiment can further reduce, by the capacity of the first spring chamber, the amount of air supplied to/discharged from the housing 1 by the output member 24 through the movement of the output member 24 in the axial direction. It is therefore possible to further prevent excessive increase/decrease in the pressure of air in the housing 1, and it is easier to keep the pressure of air in the housing 1 at a predetermined level.

The above-described embodiments are changeable as follows.

Instead of the plurality of balls 8, one or more cylindrical members with low friction may be used.

The present disclosure is applicable not only to the work supports having the structures described above by way of example, but also to work supports each having a structure different from those. Furthermore, the present disclosure may be used for applications other than the work supports.

REFERENCE SIGNS LIST

1: housing; 3: support rod; 5: collet; 6: first piston (piston); 13: first actuation chamber; 14: first spring; 21: second actuation chamber (actuation chamber); 24: output member; 25*a*: flange portion; 28: communication passage; 28*a*: first communication passage; 28*b*: second communication passage; 33: second spring (release spring); 38: advance spring (biasing mechanism); 41: air spring (biasing mechanism); 43: base-end-side actuation chamber; 44: leading-end-side actuation chamber.

The invention claimed is:

1. A work support comprising:
 a support rod (3) inserted in a housing (1) so as to be movable toward a leading end side and toward a base end side in an axial direction of the support rod (3);
 a collet (5) fitted over an outer peripheral wall of the support rod (3);
 a piston (6) inserted in the housing (1) so as to be movable in the axial direction, the piston (6) being configured to cause the collet (5) to grip and hold the support rod (3);
 an actuation chamber (21) provided in a base end portion of the housing (1);
 an output member (24) configured to be moved toward the leading end side in the axial direction by pressurized oil supplied to the actuation chamber (21);
 a release spring (33) attached in the actuation chamber (21), to which the pressurized oil is supplied, and between a leading end wall (31) of the actuation chamber (21) and a flange portion (25*a*) provided to a base end portion of the output member (24), the release spring (33) being configured to bias the output member (24) toward the base end side; and
 a biasing mechanism (38, 41) configured to bias the support rod (3) and the output member (24) so that the support rod (3) and the output member (24) recede from each other;
 wherein the actuation chamber (21) includes a base-end-side actuation chamber (43) provided on the base end side in the axial direction relative to the flange portion (25*a*), and a leading-end-side actuation chamber (44) provided on the leading end side in the axial direction relative to the flange portion (25*a*), the leading-end-side actuation chamber (44) being communicatively connected to the base-end-side actuation chamber (43), wherein the release spring (33) is disposed in the leading-end-side actuation chamber (44).

2. The work support according to claim 1, wherein the leading-end-side actuation chamber (44) is communicatively connected to the base-end-side actuation chamber (43) by a communication passage (28) provided in the output member (24).

3. The work support according to claim 2, wherein the communication passage (28) includes:
 a first communication passage (28*a*) opening onto a base end surface of the output member (24), the base end surface being on the base end side in the axial direction; and
 a second communication passage (28*b*), which is communicatively connected to the first communication passage (28*a*) and opens onto an outer peripheral surface of the output member (24).

4. The work support according to claim 3, wherein:
 the actuation chamber (21) functions as a second actuation chamber (21);
 the work support further includes
 a first actuation chamber (13) configured to move the piston (6) toward the base end side in the axial direction, the first actuation chamber (13) being communicatively connected to the leading-end-side actuation chamber (44), and
 a first spring (14) configured to move the piston (6) toward the leading end side in the axial direction; and
 the first spring (14) is disposed in the first actuation chamber (13), to which the pressurized oil is supplied.

5. The work support according to claim 4, wherein the first spring (14) is disposed on the base end side in the axial direction relative to the piston (6), in the first actuation chamber (13).

6. The work support according to claim 2, wherein:
 the actuation chamber (21) functions as a second actuation chamber (21);
 the work support further includes
 a first actuation chamber (13) configured to move the piston (6) toward the base end side in the axial direction, the first actuation chamber (13) being communicatively connected to the leading-end-side actuation chamber (44), and a first spring (14) configured to move the piston (6) toward the leading end side in the axial direction; and the first spring (14) is disposed in the first actuation chamber (13), to which the pressurized oil is supplied.

7. The work support according to claim 6, wherein the first spring (14) is disposed on the base end side in the axial direction relative to the piston (6), in the first actuation chamber (13).

\* \* \* \* \*